United States Patent
Raeber et al.

(10) Patent No.: US 11,809,150 B1
(45) Date of Patent: Nov. 7, 2023

(54) INTEROPERABILITY OF SECONDARY-DEVICE HUBS

(71) Applicant: Amazon Technologies, Inc., Seattle, WA (US)

(72) Inventors: Eric Peter Raeber, Redwood City, CA (US); Robert Franklin Ebert, Los Altos Hills, CA (US); Adam Barry Fineberg, Saratoga, CA (US); Mark Sander Urbanus, San Jose, CA (US); Miroslav Ristic, San Jose, CA (US); Maxim Spivak, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/737,383

(22) Filed: May 5, 2022

Related U.S. Application Data

(63) Continuation of application No. 16/523,481, filed on Jul. 26, 2019, now Pat. No. 11,340,566, which is a continuation of application No. 14/788,327, filed on Jun. 30, 2015, now Pat. No. 10,365,620.

(51) Int. Cl.
*G05B 15/02* (2006.01)
*H04L 12/28* (2006.01)
*H04W 4/80* (2018.01)

(52) U.S. Cl.
CPC .......... *G05B 15/02* (2013.01); *H04L 12/2803* (2013.01); *H04W 4/80* (2018.02)

(58) Field of Classification Search
CPC ....... G05B 15/02; H04L 12/2803; H04W 4/80
See application file for complete search history.

(56) References Cited

U.S. PATENT DOCUMENTS

| | | | |
|---|---|---|---|
| 5,086,385 | A | 2/1992 | Launey et al. |
| 5,307,295 | A | 4/1994 | Taylor et al. |
| 6,052,750 | A | 4/2000 | Lea |
| 6,653,933 | B2 | 11/2003 | Raschke et al. |
| 6,654,720 | B1 | 11/2003 | Graham et al. |

(Continued)

FOREIGN PATENT DOCUMENTS

KR 100998897 B1 12/2010

OTHER PUBLICATIONS

Bendersky, "Finite State Machines and Regular Expressions", retrieved on Mar. 18, 2016 at <<https://www.gamedev.net/articles/programming/general-and-gameplay-programming/finite-state-machines-and-regular-expressions-r3176>>, GameDev, Jun. 4, 2013.

(Continued)

*Primary Examiner* — Kidest Bahta
(74) *Attorney, Agent, or Firm* — Lee & Hayes, P.C.

(57) ABSTRACT

Traditional home-automation systems utilize a single hub for controlling secondary devices within a home. The techniques described herein, meanwhile, utilize multiple hubs within the environment and/or located remotely from the environment. For instance, an environment may include multiple electronic devices, each configured to control one or more secondary devices within the environment. In addition, a remote service may be configured to control one or more secondary devices within the environment. As such, each controlling device stores and executes an instance of a control engine, rather than relying on a single instance of a control engine located at a single controlling hub.

20 Claims, 8 Drawing Sheets

(56) References Cited

U.S. PATENT DOCUMENTS

| | | |
|---|---|---|
| 6,725,281 B1 | 4/2004 | Zintel et al. |
| 6,812,881 B1 | 11/2004 | Mullaly et al. |
| 6,845,451 B1 | 1/2005 | Anand et al. |
| 6,930,788 B1 | 8/2005 | Iwamoto et al. |
| 7,139,716 B1 | 11/2006 | Gaziz |
| 7,418,392 B1 | 8/2008 | Mozer et al. |
| 8,078,290 B2 | 12/2011 | Nelson |
| 8,116,754 B2 | 2/2012 | Kim et al. |
| 8,176,503 B2 | 5/2012 | Ford et al. |
| 8,340,975 B1 | 12/2012 | Rosenberger |
| 3,490,006 A1 | 7/2013 | Reeser et al. |
| 8,516,087 B2 | 8/2013 | Wilson et al. |
| 8,850,346 B2 | 9/2014 | Keenan, Jr. et al. |
| 9,071,603 B1 | 6/2015 | Frederick et al. |
| 9,087,514 B2 | 7/2015 | Jonsson |
| 9,241,257 B1 | 1/2016 | Kim et al. |
| 9,443,527 B1 | 9/2016 | Watanabe et al. |
| 9,554,061 B1 | 1/2017 | Proctor, Jr. et al. |
| 9,680,646 B2 | 6/2017 | Nadathur et al. |
| 9,875,647 B1 | 1/2018 | Tannenbaum et al. |
| 10,453,461 B1 | 10/2019 | Mutagi et al. |
| 2001/0041982 A1 | 11/2001 | Kawasaki et al. |
| 2002/0129353 A1 | 9/2002 | Williams et al. |
| 2003/0012168 A1 | 1/2003 | Elson et al. |
| 2003/0018805 A1* | 1/2003 | Meyerson ........... H04L 41/0886 709/230 |
| 2003/0040812 A1 | 2/2003 | Gonzales et al. |
| 2003/0103088 A1 | 6/2003 | Dresti et al. |
| 2004/0070491 A1 | 4/2004 | Huang et al. |
| 2004/0267385 A1 | 12/2004 | Lingemann |
| 2005/0071879 A1 | 3/2005 | Haldavnekar et al. |
| 2005/0096753 A1* | 5/2005 | Arling ................. H04L 12/2805 700/11 |
| 2005/0108369 A1 | 5/2005 | Sather et al. |
| 2005/0131551 A1 | 6/2005 | Ruutu et al. |
| 2006/0077174 A1 | 4/2006 | Chung et al. |
| 2006/0080408 A1 | 4/2006 | Istvan et al. |
| 2006/0123053 A1 | 6/2006 | Scannell, Jr. |
| 2006/0248557 A1 | 11/2006 | Stark et al. |
| 2007/0260713 A1 | 11/2007 | Moorer et al. |
| 2007/0287542 A1 | 12/2007 | Miyazaki et al. |
| 2008/0037485 A1 | 2/2008 | Osinga et al. |
| 2008/0064395 A1 | 3/2008 | Sibileau |
| 2008/0167931 A1* | 7/2008 | Gerstemeier ...... G06Q 10/0631 705/7.22 |
| 2008/0313299 A1 | 12/2008 | Ebbe et al. |
| 2009/0046715 A1 | 2/2009 | McCoy |
| 2009/0076827 A1 | 3/2009 | Bulitta et al. |
| 2009/0204410 A1 | 8/2009 | Mozer et al. |
| 2009/0316671 A1 | 12/2009 | Rolf et al. |
| 2010/0104255 A1 | 4/2010 | Yun et al. |
| 2010/0185445 A1 | 7/2010 | Comerford et al. |
| 2010/0289643 A1 | 11/2010 | Trundle et al. |
| 2011/0044438 A1 | 2/2011 | Wang et al. |
| 2011/0087726 A1 | 4/2011 | Shim et al. |
| 2011/0190913 A1 | 8/2011 | Van De Sluis et al. |
| 2011/0193579 A1* | 8/2011 | Wong ................. G06F 11/3055 324/691 |
| 2011/0205965 A1 | 8/2011 | Sprigg et al. |
| 2011/0211584 A1 | 9/2011 | Mahmoud |
| 2012/0253824 A1 | 10/2012 | Alcantara Talavera |
| 2013/0010207 A1 | 1/2013 | Valik et al. |
| 2013/0038800 A1 | 2/2013 | Yoo |
| 2013/0052946 A1 | 2/2013 | Chatterjee et al. |
| 2013/0086245 A1 | 4/2013 | Lu et al. |
| 2013/0156198 A1 | 6/2013 | Kim et al. |
| 2013/0162160 A1 | 6/2013 | Ganton et al. |
| 2013/0183944 A1 | 7/2013 | Mozer et al. |
| 2013/0188097 A1 | 7/2013 | Smith |
| 2013/0218572 A1 | 8/2013 | Cho et al. |
| 2014/0005809 A1 | 1/2014 | Frei et al. |
| 2014/0032651 A1 | 1/2014 | Singh et al. |
| 2014/0062297 A1 | 3/2014 | Bora et al. |
| 2014/0074653 A1 | 3/2014 | Wang et al. |
| 2014/0082151 A1 | 3/2014 | Chen et al. |
| 2014/0098247 A1 | 4/2014 | Rao et al. |
| 2014/0163751 A1 | 6/2014 | Davis et al. |
| 2014/0167929 A1 | 6/2014 | Shim et al. |
| 2014/0176309 A1 | 6/2014 | Wang et al. |
| 2014/0188463 A1 | 7/2014 | Noh et al. |
| 2014/0191855 A1 | 7/2014 | Kim et al. |
| 2014/0244267 A1 | 8/2014 | Levi |
| 2014/0249825 A1 | 9/2014 | Proud |
| 2014/0309789 A1 | 10/2014 | Ricci |
| 2014/0343946 A1 | 11/2014 | Torok et al. |
| 2014/0349269 A1 | 11/2014 | Canoy et al. |
| 2014/0358553 A1 | 12/2014 | Helmke et al. |
| 2014/0376747 A1 | 12/2014 | Mullet et al. |
| 2015/0005900 A1 | 1/2015 | Steele et al. |
| 2015/0006742 A1 | 1/2015 | Beals et al. |
| 2015/0019714 A1 | 1/2015 | Shaashua et al. |
| 2015/0020191 A1 | 1/2015 | Vida et al. |
| 2015/0053779 A1 | 2/2015 | Adamek et al. |
| 2015/0058955 A1 | 2/2015 | Ganapathy et al. |
| 2015/0066516 A1 | 3/2015 | Nishikawa et al. |
| 2015/0097663 A1 | 4/2015 | Sloo et al. |
| 2015/0140990 A1 | 5/2015 | Kim et al. |
| 2015/0142704 A1 | 5/2015 | London |
| 2015/0154976 A1 | 6/2015 | Mutagi |
| 2015/0161370 A1 | 6/2015 | North et al. |
| 2015/0162006 A1 | 6/2015 | Kummer |
| 2015/0163412 A1 | 6/2015 | Holley et al. |
| 2015/0168538 A1 | 6/2015 | Bradley et al. |
| 2015/0170665 A1 | 6/2015 | Gundeti et al. |
| 2015/0195099 A1 | 7/2015 | Imes et al. |
| 2015/0204561 A1 | 7/2015 | Sadwick et al. |
| 2015/0222517 A1 | 8/2015 | McLaughlin et al. |
| 2015/0236899 A1 | 8/2015 | Sengupta et al. |
| 2015/0242381 A1 | 8/2015 | Oh et al. |
| 2015/0263886 A1 | 9/2015 | Wang et al. |
| 2015/0264322 A1 | 9/2015 | Ang |
| 2015/0294086 A1 | 10/2015 | Kare et al. |
| 2015/0312113 A1 | 10/2015 | Forutanpour et al. |
| 2015/0324706 A1 | 11/2015 | Warren |
| 2015/0334554 A1 | 11/2015 | Song et al. |
| 2015/0347114 A1* | 12/2015 | Yoon .................. H04L 12/2832 717/176 |
| 2015/0347683 A1 | 12/2015 | Ansari et al. |
| 2015/0348551 A1 | 12/2015 | Gruber et al. |
| 2015/0350031 A1 | 12/2015 | Burks et al. |
| 2015/0351145 A1 | 12/2015 | Burks et al. |
| 2015/0365217 A1 | 12/2015 | Scholten et al. |
| 2015/0366035 A1 | 12/2015 | Baek et al. |
| 2015/0373149 A1 | 12/2015 | Lyons |
| 2016/0042748 A1 | 2/2016 | Jain et al. |
| 2016/0043962 A1 | 2/2016 | Kim et al. |
| 2016/0044032 A1 | 2/2016 | Kim et al. |
| 2016/0098284 A1 | 4/2016 | Hierberg et al. |
| 2016/0098997 A1 | 4/2016 | Ding |
| 2016/0099815 A1* | 4/2016 | Park ....................... H04W 4/70 370/254 |
| 2016/0134737 A1 | 5/2016 | Pulletikurty |
| 2016/0139575 A1 | 5/2016 | Funes |
| 2016/0195856 A1 | 7/2016 | Spero |
| 2016/0259308 A1 | 9/2016 | Fadell et al. |
| 2016/0269524 A1 | 9/2016 | Stottlemyer |
| 2016/0344815 A1 | 11/2016 | Hyun et al. |
| 2016/0358443 A1 | 12/2016 | True |
| 2016/0359629 A1 | 12/2016 | Nadathur et al. |
| 2016/0366481 A1 | 12/2016 | Lim et al. |
| 2017/0004828 A1 | 1/2017 | Lee et al. |
| 2017/0055126 A1 | 2/2017 | O'Keeffe |
| 2020/0159491 A1 | 5/2020 | Mutagi et al. |
| 2020/0348124 A1 | 11/2020 | Froment et al. |
| 2021/0326103 A1 | 10/2021 | Mutagi et al. |

OTHER PUBLICATIONS

Bendersky, "Finite State Machines and Regular Expressions", Retreived from <<http://www.gamedev.net/page/resources/_/technical/general-programming/finite-state-machines-and-regular-expressionsr3176>>, GameDev.net, Jun. 2013, 31 pages.

Krishna et al., "Zigbee Based Voice Control System for Smart

(56) References Cited

OTHER PUBLICATIONS

Home", IJCTA, Jan.-Feb. 2012, vol. 3, pp. 163-pp. 168.
Non Final Office Action dated Jan. 11, 2019 for U.S. Appl. No. 14/750,266 "Determining Relative Positions of User Devices" Fremont, 34 pages.
Office Action for U.S. Appl. No. 16/042,389, dated Feb. 14, 2020, Mutagi, "Grouping Devices for Voice Control", 28 Pages.
Office Action for U.S. Appl. No. 16/042,389, dated Jul. 6, 2020, Mutagi, "Grouping Devices for Voice Control ", 28 Pages.
Office Action for U.S. Appl. No. 14/752,321, dated Jan. 25, 2019, Mutagi et al., "Creating Scenes from Voice-Controllable Devices", 51 pages.
Office action for U.S. Appl. No. 14/752,321, dated Oct. 4, 2016, Mutagi et al., "Creating Scenes from Voice-Controllable Devices", 39 pages.
Office Action for U.S. Appl. No. 16/523,481, dated Nov. 13, 2020, Raeber, "Interoperability of Secondary-Device Hubs", 11 Pages.
Office Action for U.S. Appl. No. 14/752,134, dated Nov. 2, 2017, Mutagi, "Remote Execution of Secondary-Device Drivers", 37 pages.
Office action for U.S. Appl. No. 14/752,257, dated Nov. 28, 2016, Mutagi et al., "Mapping Device Capabilities to a Predefined Set", 32 pages.
Office Action for U.S. Appl. No. 16/657,938, dated Nov. 3, 2021, Mutagi, "Remote Execution of Secondary-Device Drivers", 29 pages.
Office Action for U.S. Appl. No. 14/750,266, dated Nov. 30, 2017, Mutagi, "Remote Execution of Secondary-Device Drivers", 29 pages.
Office action for U.S. Appl. No. 14/752,198, dated Dec. 2, 2016, Mutagi et al., "Grouping Devices for Voice Control", 33 pages.
Final Office Action dated Dec. 14, 2018 for U.S. Appl. No. 14/752,134 "Remote Execution of Secondary-Device Drivers" Mutagi, 50 pages.
Office action for U.S. Appl. No. 14/752,198, dated Dec. 26, 2017, Mutagi et al., "Grouping Devices for Voice Control", 20 pages.
Office action for U.S. Appl. No. 14/752,321, dated Dec. 26, 2017, Rohan Mutagi, "Creating Scenes from Voice-Controllable Devices", 47 pages.
Office Action for U.S. Appl. No. 16/424,285, dated Dec. 27, 2021, Mutagi, "Creating Scenes From Voice-Controllable Devices", 32 pages.
Office action for U.S. Appl. No. 14/752,198, dated Mar. 10, 2016, Mutagi et al., "Grouping Devices for Voice Control", 17 pages.
Office action for U.S. Appl. No. 14/752,257, dated Mar. 14, 2016, Mutagi et al., "Mapping Device Capabilities to a Predefined Set", 19 pages.
Office action for U.S. Appl. No. 14/752,321, dated Mar. 23, 2016, Mutagi et al., "Creating Scenes from Voice-Controllable Devices", 21 pages.
Office action for U.S. Appl. No. 14/752,134, dated Mar. 24, 2016, Mutagi et al., "Remote Execution of Secondary-Device Drivers", 17 pages.
Office Action for U.S. Appl. No. 14/788,327, dated Apr. 10, 2018, Raeber et al., "Interoperability of Secondary-Device Hubs", 15 pages.
Office Action for U.S. Appl. No. 16/523,481, dated Apr. 13, 2021, Raeber , "Interoperability of Secondary-Device Hubs", 12 pages.
Office Action for U.S. Appl. No. 14/752,134, dated Apr. 19, 2018, Mutagi, "Remote Execution of Secondary-Device Drivers", 48 pages.
Office action for U.S. Appl. No. 14/752,321, dated May 25, 2017, Rohan Mutagi, "Creating Scenes from Voice-Controllable Devices", 45 pages.
Office action for U.S. Appl. No. 14/752,134, dated May 3, 2017, Mutagi et al., "Remote Execution of Secondary-Device Drivers", 28 pages.
Office Action for U.S. Appl. No. 14/752,321, dated Jun. 15, 2018, Mutagi, "Creating Scenes from Voice-Controllable Devices", 51 pages.
Office Action for U.S. Appl. No. 14/750,266, dated Jun. 28, 2018, Froment, "Determining Relative Positions of User Devices", 32 pages.
Office action for U.S. Appl. No. 14/752,198, dated Jun. 30, 2017, Mutagi et al., "Grouping Devices for Voice Control", 43 pages.
Office Action for U.S. Appl. No. 14/752,257, dated Aug. 11, 2017, Rohan, "Mapping Device Capabilities to a Predefined Set", 51 pages.
Office Action for U.S. Appl. No. 16/523,481, dated Aug. 18, 2021, Raeber, "Interoperability of Secondary-Device Hubs", 12 pages.
Office Action for U.S. Appl. No. 16/042,389, dated Aug. 19, 2019, Mutagi, "Grouping Devices for Voice Control", 24 pages.
Office Action for U.S. Appl. No. 16/424,285, dated Aug. 20, 2021, Mutagi, "Creating Scenes From Voice-Controllable Devices", 32 pages.
Office Action for U.S. Appl. No. 14/788,327, dated Sep. 12, 2018, Raeber et al., "Interoperability of Secondary-Device Hubs", 13 pages.
Office action for U.S. Appl. No. 14/752,134, dated Sep. 22, 2016, Mutagi et al., "Remote Execution of Secondary-Device Drivers", 24 pages.
Ranger, "What is Apple iBeacon? Here's what you need to know", ZDNet, retreived at <<http://www.zdnet.com/article/what-is-apple-ibeacon-heres-what-you-need-to-know/>>, Jun. 10, 2014, 4 pages.

* cited by examiner

INTEROPERABILITY OF SECONDARY-DEVICE HUBS

CROSS-REFERENCE TO RELATED APPLICATION(S)

This application is a continuation of and claims priority to U.S. patent application Ser. No. 16/523,481, filed Jul. 26, 2019, which is a continuation of and claims priority to U.S. patent application Ser. No. 14/788,327, filed Jun. 30, 2015, now U.S. Pat. No. 10,365,620, issued Jul. 30, 2019, the entirety of which are incorporated herein by reference.

BACKGROUND

Homes are becoming more wired and connected with the proliferation of computing devices (such as desktops, tablets, entertainment systems, and portable communication devices) and smart appliances (such as smart light bulbs, thermostats, and the like). In some instances, users are able to use a computing device to control a smart appliance. To provide one example, a user may use an application on his tablet computing device to control settings of a thermostat in the user's home. While secondary devices are becoming more prevalent, ways to interact with these secondary devices continue to evolve.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
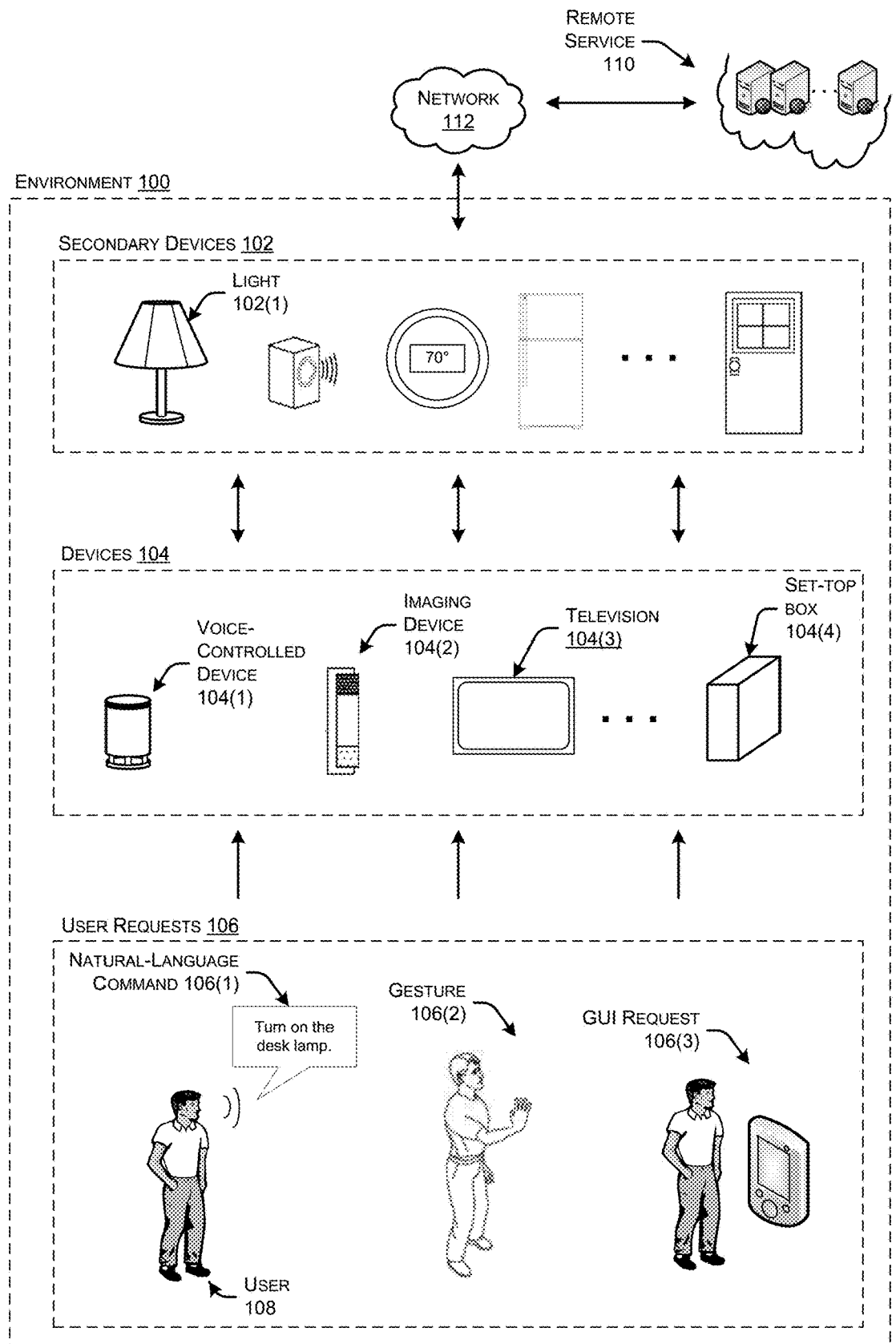
FIG. 1 is a schematic diagram of an illustrative environment that includes electronic devices configured to control different secondary devices within the environment, such as lights, thermostats, window blinds, audio systems, and the like. In some instances, users may send requests to change states of these secondary devices to these electronic devices, which may in turn cause the secondary devices to change their states in accordance with the user requests.

Techniques for controlling secondary devices (or "smart appliances") are described herein. For instance, one or more secondary devices may reside within an environment, along with one or more electronic devices that communicatively couple with the secondary devices and are configured to control the secondary devices. To do so, the electronic devices may be configured to send control signals to the secondary devices for causing the secondary devices to perform certain operations. For instance, a user in the environment may provide, to one of the electronic devices, a request that one of the secondary devices perform a certain operation. The device, may then send the request to perform the operation directly or indirectly to the secondary device, as described below. Upon receiving a command to perform the operation, the secondary device may perform the operation.

The secondary devices may comprise lights, televisions, audio systems, door locks, garage door openers, washing machines, dryers, dishwashers, coffee makers, refrigerators, doors, automated window shades, tablets, telephones, or the like. That is, the secondary devices may comprise any type of "home-automation" device configured to communicate wired or wirelessly with a controlling electronic device. The controlling electronic devices, meanwhile, may comprise voice-controlled devices, imaging devices, tablet computing devices, televisions, mobile phones, or the like. In some instances, servers that are remote from the environment of the secondary devices may also be configured to control one or more secondary devices within the environment.

Traditional home-automation systems utilize a single hub for controlling secondary devices within a home. The techniques described herein, meanwhile, utilize multiple hubs within the environment and/or located remotely from the environment. For instance, an environment may include multiple electronic devices, each configured to control one or more secondary devices within the environment. In addition, a remote service may be configured to control one or more secondary devices within the environment. As such, each controlling device stores and executes an instance of a control engine, rather than relying on a single instance of a control engine located at a single controlling hub.

Utilizing multiple "hubs" has many benefits. First, because different electronic devices are able to communicate via different wired or wireless protocols, utilizing multiple electronic devices as hubs may expand the number of secondary devices that the home-automation system is collectively able to control. For instance, secondary devices may communicate via an array of wireless protocols, such as via Bluetooth®, ZigBee®, Z-Wave®, TCP/IP, Thread®, HomeKit®, and the like. However, not all electronic devices may be configured to communicate via each of these protocols. As such, by utilizing multiple electronic devices as home-automation hubs, the collective capabilities of all of the electronic devices may be increased, thus increasing the amount of secondary devices within an environment that the home-automation system is able to control.

In addition, by distributing instances of a control engine across multiple electronic devices (or "home-automation hubs"), the resulting system includes redundancy. Therefore, if one electronic device hosting an instance of the control engine goes down, one or more other hubs may still allow the home-automation system to continue functioning.

Next, by providing instances of a control engine on electronic devices located within the local environment of the secondary devices being controlled, the described techniques may reduce latency and increase efficacy of the system. That is, traditional home-automation systems may require user requests to modify state of secondary devices be sent to and processed "in the cloud" (i.e., remote from the environment), while the techniques described herein allow local instances of a control engine to handle these requests. Therefore, the system continues to function even if a network connection between the environment and a remote service is lost (e.g., a user's home or office Internet is down). In addition, the system is able to execute a user's command without the need to interact with a remote service over a network, thus reducing the latency associated with the request. Further, and as described below, the system may route user requests amongst multiple local electronic devices, thus again reducing latency associated with making calls to the remote service.

While the system may include local instance(s) of a control engine as discussed immediately above, in some instances the system may also include an instance of the control engine executing at a remote service. Therefore, the system still allows for control of secondary devices outside of the environment, via communication with the remote service over the network. For instance, a user may utilize an application on his mobile device configured to communicate with the remote service, which in turn communicates with secondary devices in the environment. As such, the user may be able to check the state of secondary devices in his home or office (e.g., "did I leave the lights on?") and may also be able to control states of the secondary devices (e.g., may be able to turn off the lights from his mobile device).

As introduced above, multiple electronic devices within an environment may store and execute an instance of a control engine that is configured to control secondary devices within the environment. Within this architecture, each controlling electronic device may be responsible for controlling one or more secondary devices within the environment. For instance, a first electronic device may be responsible for controlling the downstairs lights and the downstairs television, a second electronic device may be responsible for controlling door locks in the environment, while a third electronic device may be responsible for controlling the upstairs lights and the thermostat within the environment.

A user may issue a request to change a state (i.e., perform an operation) of a secondary device within the environment in a number of ways. For instance, the user may issue this request via a voice command, a gesture, a graphical user interface (GUI) or the like. When an electronic device within the environment receives the request, the electronic device may initially identify the operation being requested and the secondary device being referenced. For instance, if a user issues a request to turn on a particular light, the electronic device (or another entity) may identify the light that the user is referencing and may identify the requested operation (turn on). After doing so, the electronic device may determine which electronic device within the environment is responsible for controlling the particular light. That is, each instance of the control engine may maintain an up-to-date listing of which electronic devices are responsible for (or "own") each secondary device within the environment. After identifying the responsible electronic device, the electronic device that received the initial request may route this request to the responsible electronic device.

Upon the responsible electronic device receiving the request, it may also identify the requested operation and the referenced secondary device. After identifying this information, the electronic device may issue a command to the secondary device to change its state in accordance with the request. To do so, in some instances the electronic device may execute, locally, a secondary-device driver associated with the secondary device. In other instances, meanwhile, the electronic device may work with the remote service, which executes, remotely, the secondary-device driver for generating a command to perform the operation (i.e., changing state). In either instance, upon receiving the command to change its state, the secondary device may execute the command and correspondingly change state. For instance, in the example discussed above, the particular light may turn on, in accordance with the user's request. The secondary device may also send an indication back to the controlling electronic device indicating that the secondary device has successfully turned on.

In response to receiving an indication of this success, the responsible electronic device may broadcast this information out to each other instance of the control engine. That is, the electronic device may send this information to other devices within the environment responsible for controlling one or more secondary devices, as well as to the remote service executing the instance of the control engine. As discussed in further detail below, each instance may maintain a current state of each secondary device within the environment. Therefore, in response to receiving this information, each instance may update the state associated with the particular light.

In other instances, meanwhile, electronic devices may subscribe to receive information regarding particular secondary devices. For instance, if the environment includes five devices in addition to the responsible device from the example above, two (for instance) may subscribe to receive state-update information regarding state changes of the particular light. Upon the responsible device receiving an indication from the light that it has successfully turned on, the responsible device may update its stored information regarding the state of the light (from OFF to ON) and may identify the devices that have subscribed to receiving state-update information about the light. The responsible device may then send this updated state information to the subscribing devices, while refraining from sending this information to other devices that have not subscribed to receive information regarding the particular light.

In still other instances, devices (or control engines stored on the devices) may subscribe to individual controlling devices (or "hubs") rather than the individual secondary devices. That is, a first device may subscribe to receive all updated state information from a second device, regardless of the secondary device to which the state information pertains. As such, whenever the second device successfully changes state of a secondary device that it is responsible for, it may send an indication of this updated state to the first device.

FIG. 1 is a schematic diagram of an illustrative environment 100 that includes electronic devices 104 configured to control different secondary devices 102 within the environment 100. As illustrated, these secondary devices 102 may include lights, thermostats, window blinds, audio systems, refrigerators, door locks, and the like. In some instances, users, such as example user 108, may send requests 106 to change states of these secondary devices 102 to these electronic devices 104, which may in turn cause the secondary devices 106 to change their states in accordance with the user requests. It is noted that in some instances, a device within the environment 100 may both be a controlling device 104, by controlling one or more secondary devices 102, and may also function as a secondary device 102, by performing one or more operations within the environment.

As introduced above and described in further detail below, each of the electronic devices 104 may store and execute an instance of a control engine for communicating with and controlling one or more of the secondary devices 102. In addition, a remote service 110 may store and execute an instance of the control engine, and may interact with and control the secondary devices 102 over a network 112. The network 112 may represent an array or wired networks, wireless networks (e.g., WiFi), or combinations thereof. The remote service 110 may generally refer to a network-accessible platform—or "cloud-based service"—implemented as a computing infrastructure of processors, storage, software, data access, and so forth that is maintained and accessible via the network 112, such as the Internet. Cloud-based services may not require end-user knowledge of the physical location and configuration of the system that delivers the services. Common expressions associated with cloud-based services, such as the remote service 110, include "on-demand computing", "software as a service (SaaS)", "platform computing", "network accessible platform", and so forth.

When a secondary device 102 is introduced in the environment, or when a secondary device is disconnected from one of the electronic devices 104 that is responsible for controlling the secondary device, one or more instances of the control engines executing on the electronic devices 104 may detect the presence of the secondary device via one or more wireless protocols. For instance, when the user 108 installs a "smart light bulb" or "smart door lock" within the environment, this secondary device may broadcast its presence, which may be detected by one or more of the electronic devices 104. In response to detecting a new secondary device, the instance of the control engine operating on the respective electronic device 104 may store an indication that it is now responsible for controlling this secondary device (i.e., that it is now the "owner" of the secondary device) and may broadcast this information to each other hub (i.e., each of the electronic devices 104 and remote service 112 executing a control-engine instance). In response, each control-engine instance may store an indication indicating that the electronic device that broadcast the message is now responsible for the identified secondary device. In other instances, the control-engine instance that assumed control of the secondary device may only send an indication that it is responsible for the secondary device to those devices that have subscribed. In still other instances, the control-engine instance that assumed control of the secondary device may only send an indication that it is responsible for the secondary device when queried by other devices.

In some instances, more than one of the electronic devices 104 may attempt to claim ownership of a secondary device. In these instances, a conflict-resolution process may be employed. For example, each control engine instance may be programmed such that an electronic device having a smallest device identification number may be deemed the owner of a secondary device if two or more electronic devices 104 attempt to claim ownership of a single secondary device. Of course, while one example conflict-resolution process is described, it is to be appreciated that multiple other processes may be employed.

After an electronic device 104 has claimed responsibility for controlling a particular secondary device, that secondary device may now be controlled within the environment 100 through the electronic devices 104 and/or the remote service. For instance, FIG. 1 illustrates the following example devices: a voice-controlled device 104(1) that includes a microphone and is controllable via voice commands, an imaging device 104(2) that includes a camera and is controllable via gestures, a television 104(3) that may be controllable via voice commands, gestures, or the like, and a set-top box 104(4) that may also be controllable via voice commands, gestures, or the like. While a few example devices have been listed, it is to be appreciated that the electronic devices 104 may include tablet computers, desktop computers, wearable devices, or any other type of computing device. In an example, envision that the television 104(3) initially detected the presence of a light 102(1) within the environment and, hence, claimed ownership of the light 102(1) and broadcast (i.e., sent a message) to each other electronic device 104 and the remote service 110 indicating this ownership. As such, each instance of the control engine executing on the electronic devices 104 and the remote service 112 may store an indication indicating that the television 104(3) is responsible for controlling the light 102(1).

Thereafter, envision that the user 108 issues, to the voice-controlled device 104(1), a voice command 106(1) to turn on the light 102(1). In response, the voice-controlled device 104(1) may generate an audio signal including this voice command and either perform speech recognition on the audio signal to identify the command or send this audio signal to another entity, such as the remote service 110, for performing speech-recognition thereon and identifying the voice command.

After the voice-controlled device 104(1) identifies the voice command, the device 104(1) may identify the requested operation and the referenced secondary device (the light 102(1)). After doing so, the voice-controlled device 104(1) may determine, from its memory maintaining the owners of each of the secondary devices 102 within the environment 100, that the television 104(3) is responsible for controlling the light 102(1). As such, the voice-controlled device 104(1) may pass this request to the television 102(1). In response, the television 102(1) may issue a command or work with the remote service to issue a command for causing the light 102(1) to turn on. Upon receiving such a command, the light 102(1) may turn on, complying with the user's initial request 106(1). In some instances, such as where the remote service 110 performs the speech-recognition on the audio signal to identify the voice command, the remote service 110 may pass the request to the television 104(3) rather than the voice-controlled device 104(1) passing this request.

While the above example describes the user 108 issuing the voice command 106(1) to ultimately control the light 102(1), this request may take other forms. FIG. 1, for instance, illustrates that the user may perform user gestures 106(2), which may be identified by the imaging device 104(2) or other devices that include a camera, for controlling the secondary devices 102. Additionally or alternatively, the user may utilize a graphical user interface (GUI) on a device to issue GUI requests 106(3) for controlling the secondary devices 102.

Within the environment 100 of FIG. 1, each of the secondary devices 102 may be owned by one of the controlling devices 104. Further, each of the devices 104 may store and locally execute an instance of a control engine for controlling the secondary devices that it controls, while also storing indications of the current state of all secondary devices within the environment and indications of which electronic devices 104 own which secondary devices 102. Therefore, the architecture described in FIG. 1 allows the electronic devices 104 to route the user requests 106 to change the state of the secondary devices 102 to the appropriate electronic devices 104, and potentially to the remote service when appropriate. Further, the architecture allows for redundancy by providing multiple control hubs, rather than a centralized hub.

Figure 2:
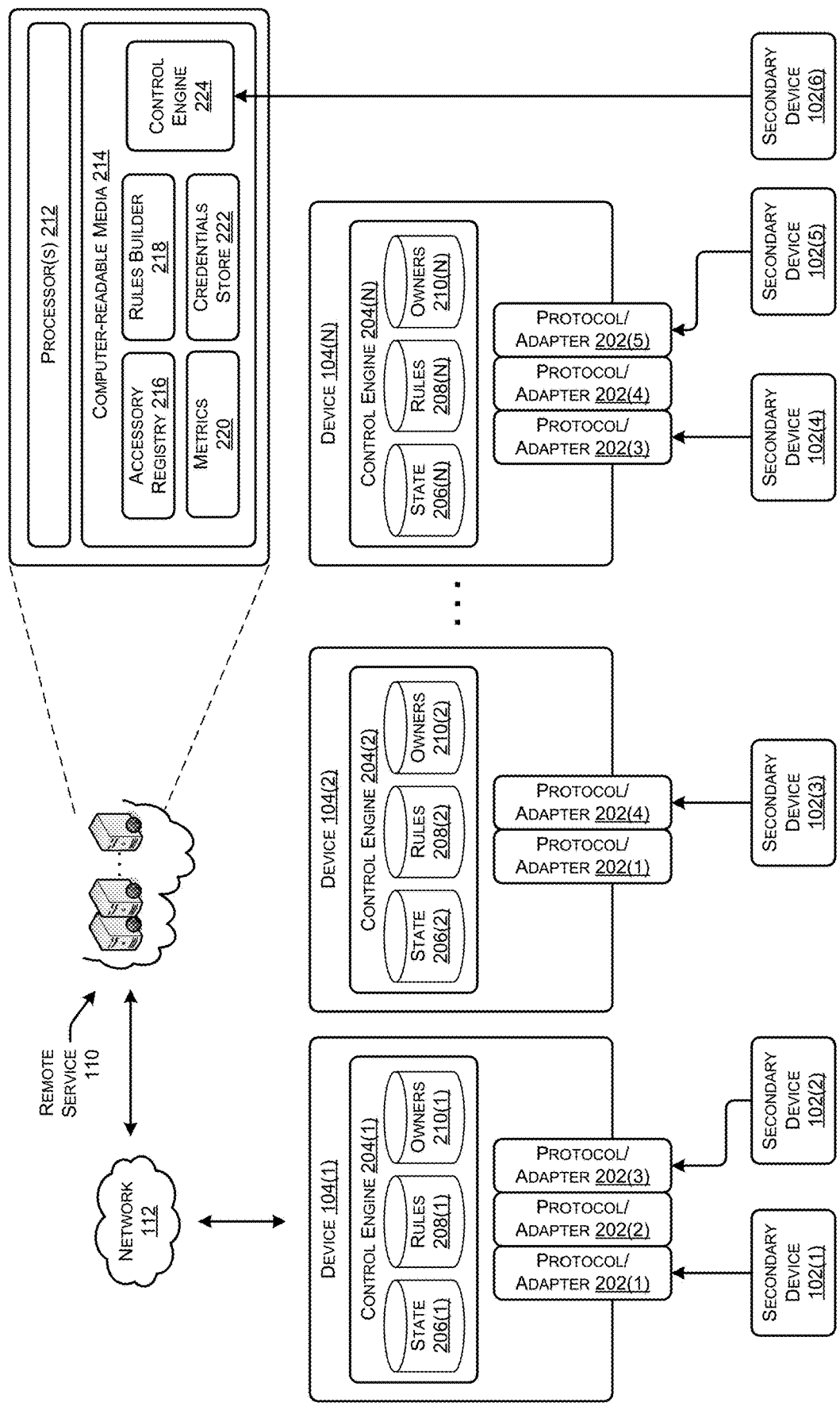
FIG. 2 shows the electronic devices for controlling the secondary devices in greater detail. As such, each electronic device that controls one or more secondary devices includes a control engine such that control of secondary devices within an environment does not rely on a single hub. Instead, each electronic device configured to control a secondary device—or each "hub"—stores an instance of the control engine for controlling the secondary devices. In addition, a remote service may also store an instance of the control engine, also as illustrated.

FIG. 2 shows the electronic devices for controlling the secondary devices in greater detail. As illustrated, each electronic device 104(1), 104(2), . . . 104(N) that controls one or more secondary devices includes a respective instance of a control engine 204(1), 204(2), . . . , 204(N). Each of these control engines 204 represents a home-automation hub that may control one or more secondary devices within the environment 100. In addition, the remote service may also store an instance of the control engine 222.

FIG. 2 further illustrates that each of the controlling electronic devices 104 may be associated with one or more protocols and protocol adapters, each enabling the respective device 104 to communicate via a respective protocol. For instance, these devices may be able to communicate via TCP/IP, Bluetooth®, ZigBee®, Z-wave®, and/or the like. As such, each respective device 104 may be configured with one or more respective protocol stacks (e.g., a protocol stack corresponding to Bluetooth®) and one or more corresponding protocol adapters to allow the respective device 104 to communicate with a secondary device via the protocol (e.g., Bluetooth®).

In this example, the first electronic device 104(1) includes protocol stacks and protocol adapters 202(1), 202(2), and 202(3), while the second electronic device 104(2) includes protocol stacks and protocol adapters 202(1) and 202(4), and the third electronic device 104(N) includes protocol stacks and protocol adaptors 202(3), 202(4), and 202(5). As illustrated, the first electronic device 104(1) may be configured to communicate with a first secondary device 102(1) via the protocol and protocol adapter 202(1) and with a second secondary device 102(2) via the protocol and protocol adapter 202(3). That is, the first electronic device 104(1) may be responsible for controlling the secondary devices 102(1) and 102(2), and may communicate with these secondary devices via the protocols supported by the protocols stacks/protocol adapters 202(1) and 202(3), respectively.

The second electronic device 104(2), meanwhile, may be responsible for controlling a third secondary device 102(3) and may communicate with this secondary device 102(3) via the protocol stack and adapter 202(4). The third electronic device 104(N) may be responsible for controlling a fourth secondary device 102(4) via the protocol stack and adapter 202(3) and a fifth secondary device 102(5) via the protocol stack and adapter 202(5). Finally, the control engine 222 executing on the remote service 110 may be responsible for controlling (i.e., may be the owner of) a sixth secondary device 102(6).

FIG. 2 further illustrates details regarding each instance of a control engine 204. As illustrated, the control engines 204(1), 204(2), 204(N) may include, respectively, a state database 206(1), 206(2), 206(3), a rules database 208(1), 208(2), 208(3), and an owners database 210(1), 210(2), 210(3). The owners databases 210 may maintain a current listing of which of the electronic devices 104 or the remote service 110 currently owns which of the secondary devices 102. As discussed above, when one of the electronic devices 104 or the remote service 110 claims responsibility for controlling a particular secondary device, that electronic device 104 may broadcast out this ownership. In response, each other electronic device 104 and the remote service 110 may update is owner database 210.

The state database 206, meanwhile, may maintain a current state of each of the secondary devices. State may include binary states (e.g., whether a light is on or off, whether a lock or locked or unlocked, whether a garage door is open or closed) and non-binary states (e.g., a current brightness level of a television, a current color of a smart light bulb, a time at which a coffee maker is set to turn on, etc.). When a control engine of an electronic device 104 or the remote service 110 successfully changes the state of a secondary device, that device 104 or remote service 110 may broadcast out this information in addition to updating its own state database. In response to receiving this information, each respective device 104 and remote service 110 may update its corresponding state database 206.

The rules databases 208, meanwhile, may store one or more rules. Rules may comprise one or more conditions that, when met, result in the execution of one or more operations on one or more secondary devices. In some instances, a user may utilize voice commands, gestures, or GUIs to create one or more rules. For instance, a user may create a rule to turn on his upstairs lights and start the coffee maker at 7:00am. In another example, the user may create a rule that certain operations should occur when the user leaves his house and when he returns. For instance, the user may set a rule that the garage door should close and the front door should lock when the user is not home, and that the garage door should open and the front door unlock when the user returns home. In this example, when one of the electronic devices 104 senses that the user has left or returned home, that device may execute the rule by, for example, identifying which control engine owns the secondary devices associated with the rule and may issue one or more requests to these control engines to perform the operations dictated by the rule. In one example, the user may be determined to be away from home (thus triggering execution of a rule) when a mobile device of the user is not sensed by any of the devices 104. Conversely, the user may be determined to be arriving home (thus triggering execution of another rule) when one of the devices 104 detects the presence of the mobile device after an absence.

FIG. 2 also illustrates example components of the remote service 110. As illustrated, the remote service 110 may include one or more processors 212 and computer-readable media 214, which may store an accessory registry 216, a rules builder 218, one or more metrics 220, a credentials store 222, and an instance of a control engine 224 that may include some or all of the functionally described below with reference to FIG. 3. The accessory registry includes functionality to allow devices (including the remote service 110) to claim ownership of a secondary device. In addition, the registry 216 may store an instance of the owners databases 210 that maintains the current listing of which of the electronic devices 104 or the remote service 110 currently owns which of the secondary devices 102. The accessory registry 304 may also store indications of the respective capabilities of each secondary device.

The rules builder 218, meanwhile, may include functionality for allowing users to build one or more rules, such as the rules described immediately above. In addition, the rules builder 218 may include functionality for executing rules, also as described above and as described in further detail below with reference to FIG. 3.

The metrics 220, meanwhile, may store any type of information regarding how users interact with the secondary devices 102. For instance, these metrics 220 may include how often a user requests to turn on a secondary device, a typical time of day the user does so, the user's preferred settings of a particular secondary device, and the like. In some instances, the rules builder 218 utilizes the metrics for suggesting rules to the user. For instance, if the user often requests turn on his upstairs lights at 7am (as indicated by the metrics 220), the rules builder 218 may suggest that the user create a rule for automatically turning on the upstairs lights at 7am.

The credentials store 222 may store, as permitted by users, one or more sets of user credentials for the provisioning of new secondary devices. For instance, the credentials store 222 may store information needed for secondary device to connect to a user's home WiFi network, such as the network name and password. Therefore, when the user purchases a new secondary device that communicates via WiFi, the remote service 110 may reference the credentials store 222 to obtain the network name and password of the user's WiFi network and may provide this information to the new secondary device, which may use this information to connect to the network. The credentials store 222 may store additional credentials, such as information for connecting to a Bluetooth® device, a Zigbee® device, or the like.

Using the architecture of FIG. 2, a user may issue requests to change states of one or more of the secondary devices 102(1)-(6). The user may issue these requests in a number of ways (e.g., voice, gestures, GUIs, etc.) and to any number of the devices 104 and/or the remote service 110. Upon a particular one of the devices 104 or the remote service 110 receiving a request to change a state of a secondary device, the device 104 or the remote service 110 may identify, from the owners database 210, the identity of the device 104 or remote service 110 responsible for controlling the particular secondary device and may pass the request along accordingly. The owner of this secondary device may thereafter receive the request and may cause the secondary device to perform the requested operation.

Figure 3:
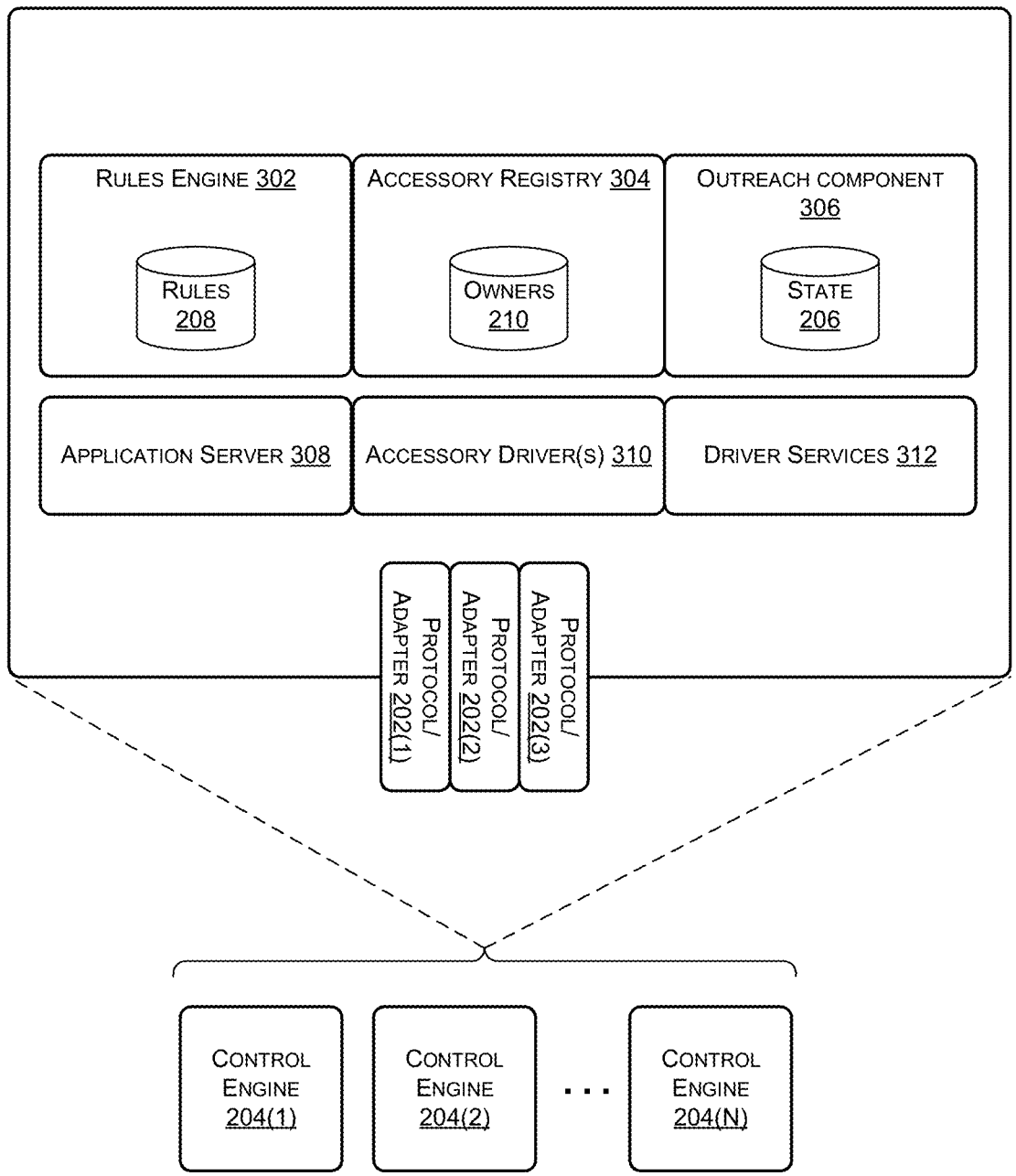
FIG. 3 illustrates example details of the control engine from FIG. 2. As shown, each electronic device capable of controlling a secondary device may execute an instance of the control engine.

FIG. 3 illustrates example details of the control engine from FIG. 2. As shown, each electronic device capable of controlling a secondary device may execute an instance of the control engine. As illustrated, the example control engine includes a rules engine 302, an accessory registry 304, and an outreach component 306. The rules engine 302 may execute the one or more rules 208 when the conditions of the respective rules are met, as described above. Using the example from above, for instance, the rules 208 may include a rule stating that the garage door should close and the front door should lock when the user is not home, and that the garage door should open and the front door unlock when the user returns home. In this example, when one of the rule engine 302 receives an indication that the user has left or returned home, that rule engine 302 may execute the rule by, for example, identifying which control engine owns the secondary devices associated with the rule and may issue one or more requests to these control engines to perform the operations dictated by the rule. In some instances, the rules engine 302 may also allow a user to create one or more rules, as described above with reference to the rules builder 208.

The accessory registry 304, meanwhile, includes functionality to allow the control engines of the devices to claim ownership of a secondary device, as described above. In addition, the registry 304 may store the owners databases 210 that maintains the current listing of which of the electronic devices 104 or the remote service 110 currently owns which of the secondary devices 102. The accessory registry 304 may also store indications of the respective capabilities of each secondary device. The outreach component 306, meanwhile, stores the state database 206 and comprises functionality for sending state updates to other electronic devices 104. When a particular device updates state of a secondary device, the outreach component may broadcast out a message indicating this state update to each other device 104, or to the devices that have subscribed with the outreach component 306 to receive the state updates associated with the particular secondary device or the particular device that issued the command to update the state. The outreach component 306 may also send an indication to other devices when the corresponding electronic device claims ownership of a secondary device. As described above, the outreach component 306 may broadcast this information to one or more of the devices, to devices that subscribe to the device, or may refrain from sending the information until queried by another device.

In addition, the illustrated control engine includes an application server 308, one or more accessory drivers 310, and driver services 312. The application server 308 provides an interface for users to access the respective control engine (e.g., from their client computing devices) for purposes of configuring rules, determining secondary-device states, and the like. In addition, the control engine may store the accessory drivers 310 for certain secondary devices, such as the secondary devices that the respective control engine is responsible for. In other instances, meanwhile, the control engine may utilize secondary-device drivers that are stored remotely, as described above. Finally, the driver services 312 may provide needed services to the secondary-device drivers, such as storage, I/O processing for driver commands, and the like. Finally, the control engine may include one or more protocol stacks and protocol adapters, as discussed above with reference to FIG. 2.

Figure 4:
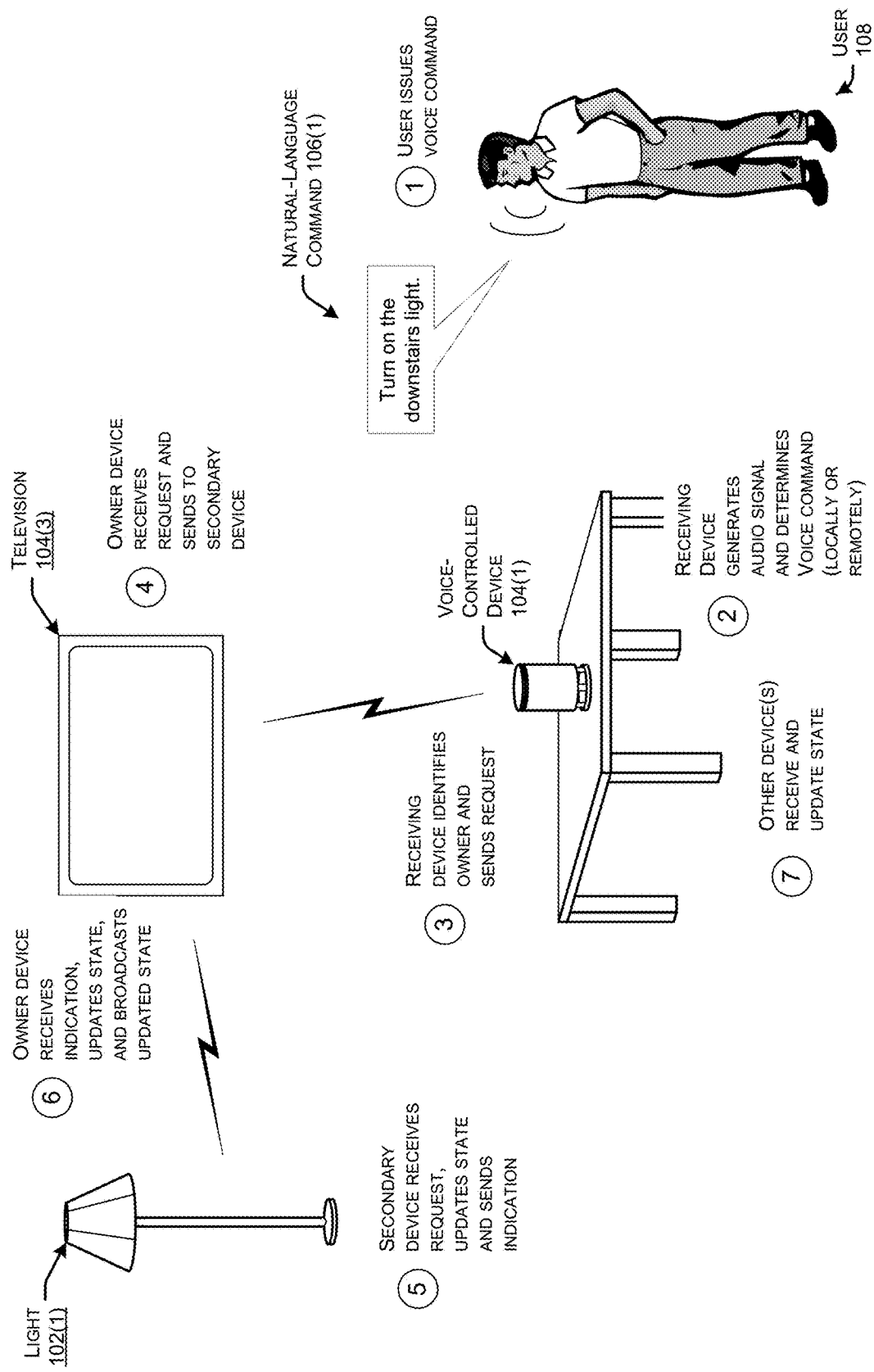
FIG. 4 shows an example sequence flow for a user issuing a request to change a state of a secondary device in an environment, a first electronic device receiving the request and passing the request to another device in the environment responsible for controlling the secondary device, and that device causing the secondary device to change its state in accordance with the user's request.

FIG. 4 shows an example sequence flow for a user issuing a request to change a state of a secondary device in the environment 100, a first electronic device receiving the request and passing the request to another device in the environment 100 responsible for controlling the secondary device, and that device causing the secondary device to change its state in accordance with the user's request. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At "1", the user 108 issues a natural-language command to "turn on the downstairs light". That is, the user 108 issues a voice command to change a state of the light 102(1) from off to on. At "2", in this example the voice-controlled device 104(1) generates an audio signal that includes the request and determines the contents of the voice command. In some instances, this may include performing speech-recognition at the device 104(1), while in other instances this may include sending the audio signal to the remote service 110 and receiving results of the speech-recognition at the device 104(1).

At "3", the voice-controlled device 104(1) identifies the owner of the referenced secondary device (the light 102(1)) and passes the request to turn on the light to the controlling device. In this example, the voice-controlled device 104(1) determines that the television 104(3) is responsible for controlling the light 102(1) and, therefore, passes the request to the television 104(3). While not illustrated, in some instances where the remote service 110 performs the speech-recognition on the audio signal generated by the voice-controlled device 104(1), the remote service 110 may pass the request to the television 104(3).

At "4", the television 104(3) receives the request and causes a command to be sent to the secondary device to cause the light 102(1) to turn on, in accordance with the user's request. In some instances, this may include the television executing a secondary-device driver associated with the light to generate a command that, when executed by the light 102(1), causes the light to turn on. In other instances, the television 104(3) may work with the remote service 110 or another entity that executes the secondary-device driver and passes the generated command to the light 102(1). In each instance, at "5" the light 102(1) receives the request to turn on and, in response, executes the requests and turns on. In addition, the light 102(1) may send a notification indicating that it has successfully changed its state to "on" back to the television 104(3).

At "6", the television 104(3) receives the indication from the light 102(1) that it has turned on and broadcasts this information out to each other controlling device 104 and/or the remote service 110. At "7", in this example at least the voice-controlled device 104(1) receives the message from the television 104(3) and updates its local database to indicate the updated state of the light 102(1).

Figure 5A:
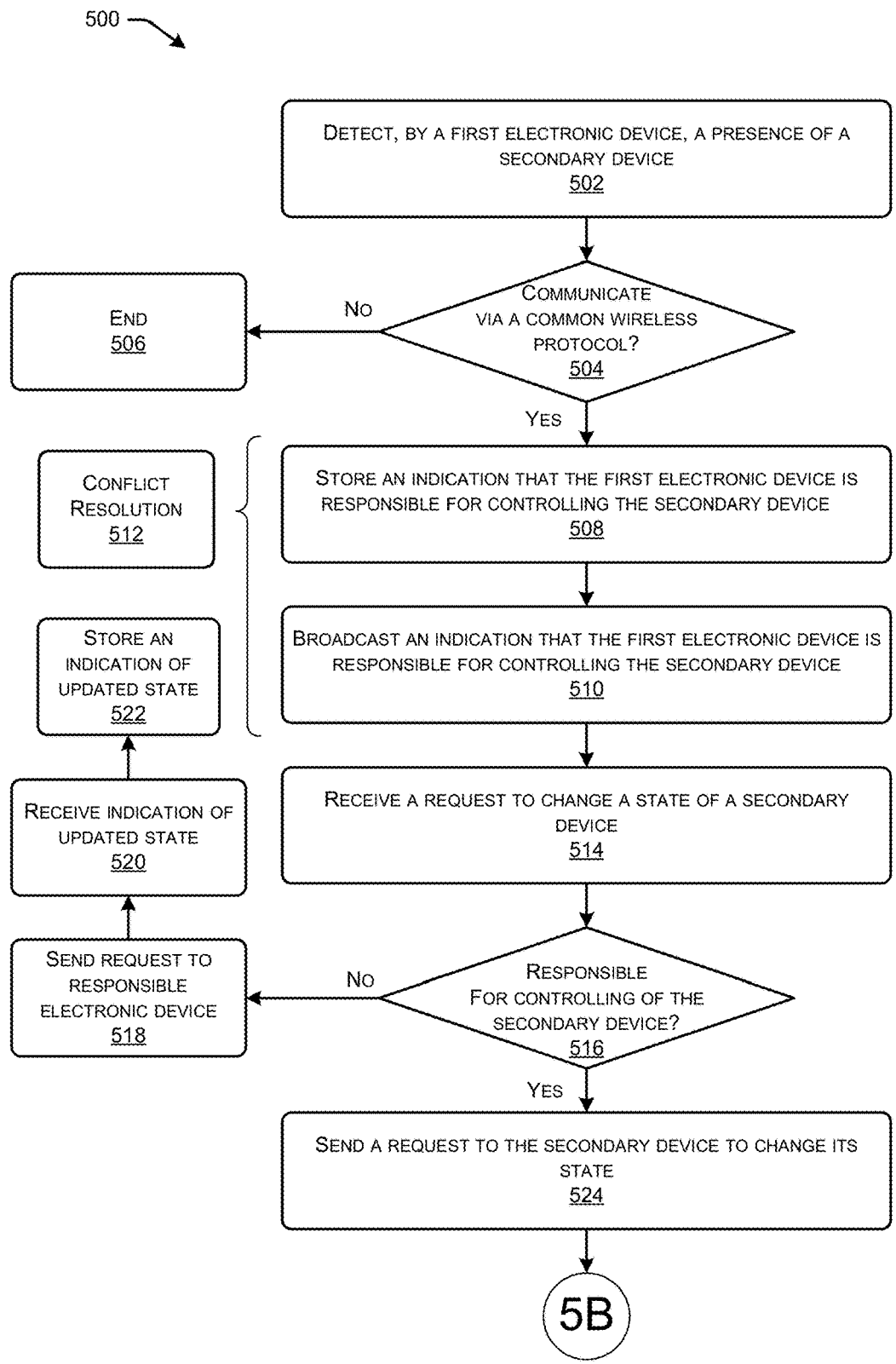
FIGS. 5A-B collectively illustrate an example process for electronic devices in an environment taking ownership of secondary devices in the environment, and thereafter causing secondary device to change states in accordance with user requests.
Figure 5B:
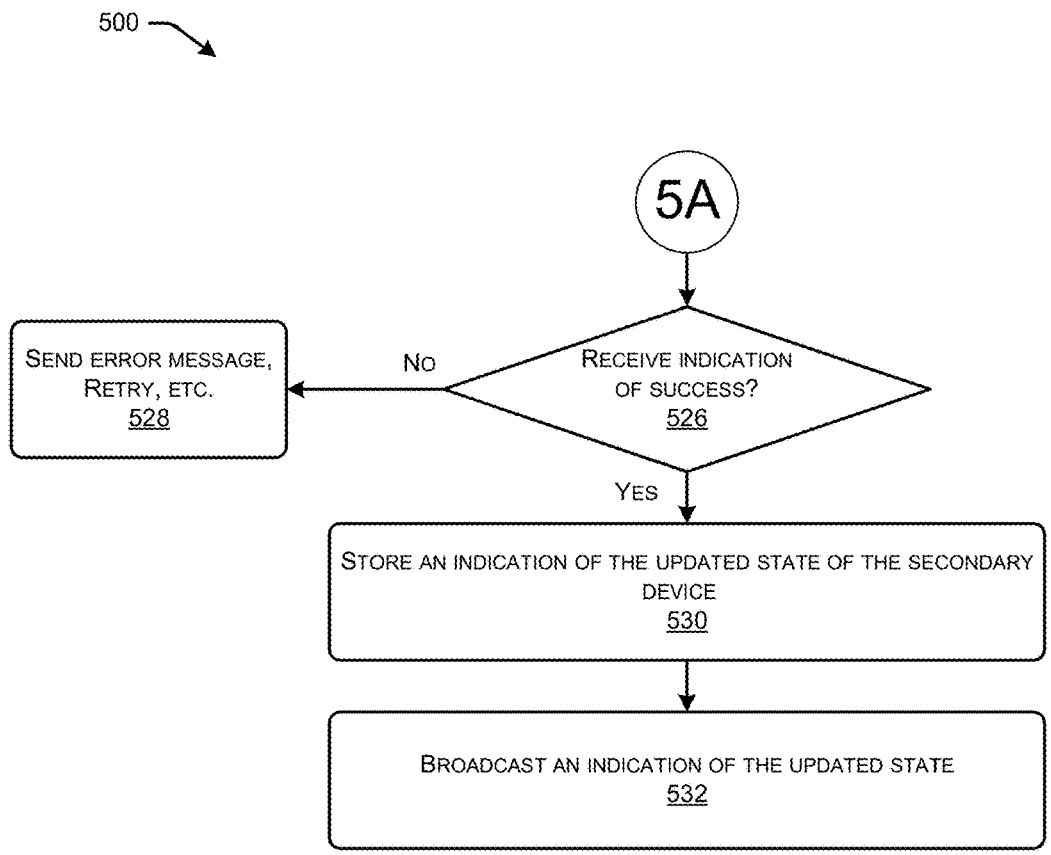

FIGS. 5A-B collectively illustrate an example process 500 for electronic devices in an environment taking ownership of secondary devices in the environment, and thereafter causing secondary device to change states in accordance with user requests.

At 502, a first electronic device detects a presence of a secondary device. For instance, upon a secondary device being installed in an environment or upon a secondary device losing its connection with another electronic device, the first electronic device may detect the presence of the secondary device and determine that the secondary device is not currently owned. At 504, the first electronic device determines whether it and the secondary device communicate via a common wireless protocol. For instance, if the first electronic device is able to communicate via TCP/IP and Bluetooth®, the first electronic device may determine if the detected secondary device is also able to communicate via one or both of these protocols. If not, then the process 500 ends at 506 and another electronic device within the environment may later claim ownership of the secondary device.

If, however, the first electronic device determines that it and the secondary device are able to communicate via a common protocol, then at 508 the first electronic device may effectively claim ownership of the secondary device by storing an indication that the first electronic device is responsible for controlling the secondary device and, at 510, may broadcast an indication of such. For instance, the first electronic device may send such an indication over a wired and/or wireless network and/or via one or more short-range wireless protocols. As a block 512 represents, if another device within the environment has also claimed ownership of the secondary device, then a conflict resolution process may occur such that only one of the devices retains ownership of the secondary device.

At 514, the first electronic device may receive a request to change a state of a secondary device within the environment, which may be a secondary device that the first electronic device controls or a secondary device that the first electronic device does not control. At 516, the first electronic device determines whether it is response for controlling the secondary device for which it received a request. If not, then at 518 the first electronic device identifies the responsible electronic device and sends the request along to that device. At 520, the first electronic device may receive an indication from the other device that it has updated the state of the secondary device (after having successfully interacted with the secondary device to change the state). In response to receiving this indication, at 522 the first electronic device stores an indication of the updated state of the secondary device.

If, however, the first electronic device determines at 516 that it is responsible for the secondary device for which it received a request, then at 524 the first electronic device sends a request to the secondary device to change its state in accordance with the request received at the first electronic device. Here, the first electronic device may send this request to the secondary device via one or more wireless protocols that the first electronic device and the secondary device are both configured to communicate with.

FIG. 5B continues the illustration of the process 500. At 526, after sending the request to the secondary device, the first electronic device determines whether it has received an indication from the secondary device indicating that the state change successfully occurred. If not, then at 528 (and potentially after some set amount of time), the first electronic device may output an error message, retry the request, or otherwise handle the error in any other manner. If, however, the first electronic device receives an indication of a successful state change from the secondary device, then at 530 the first electronic device stores an indication of the updated state for the secondary device in the state database of the first electronic device and, at 532, broadcasts an indication of the updated state to other control-engine instances for their updating of their own respective local state databases.

Figure 6:
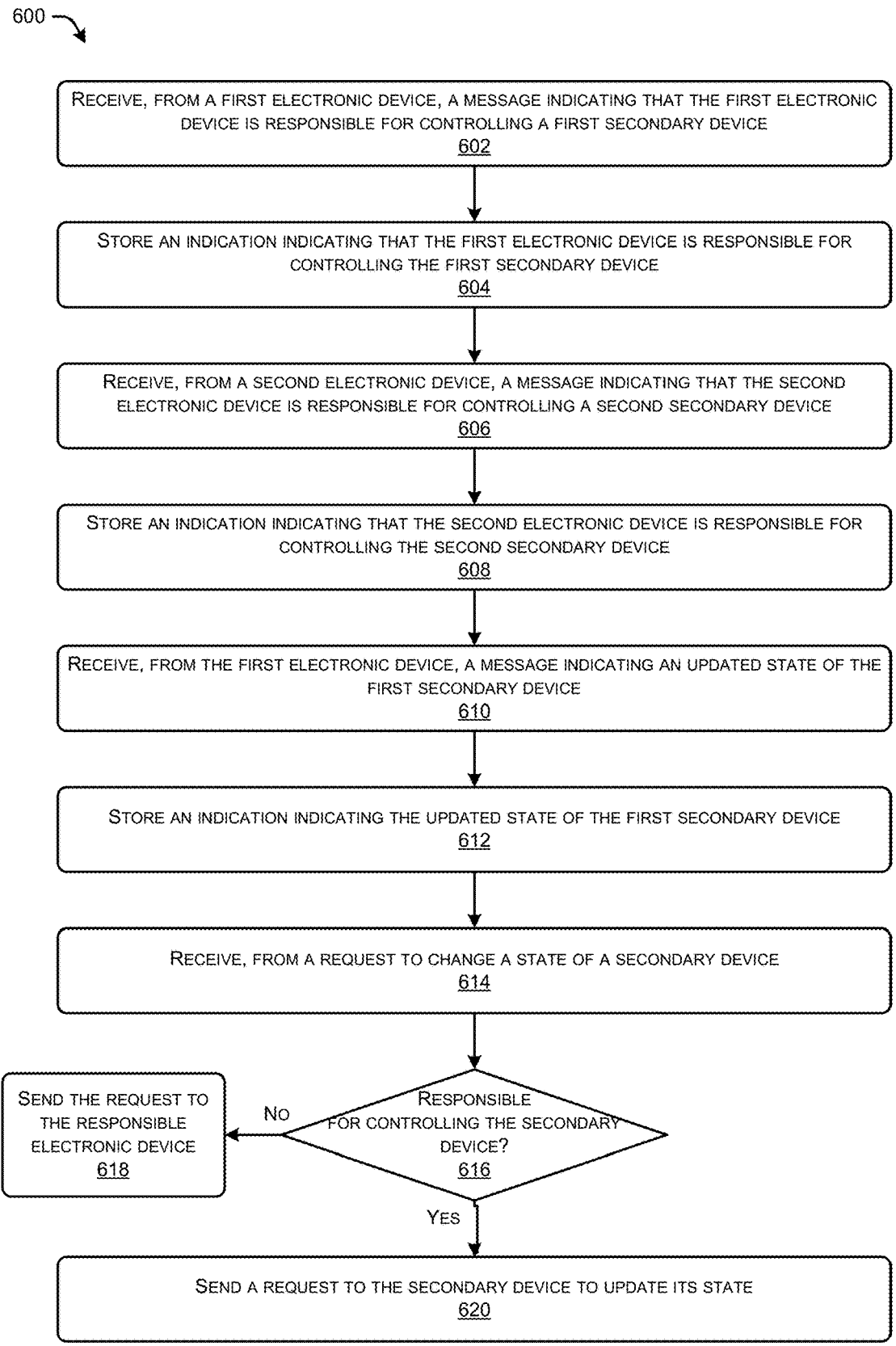
FIG. 6 illustrates an example process of a remote service executing an instance of a control engine for controlling secondary devices within an environment.

FIG. 6 illustrates an example process 600 of a remote service executing an instance of a control engine for controlling secondary devices within an environment. While FIG. 6 is described as being implemented at the remote service, it is to be appreciated that some or all of this process may be implemented at another entity, such as at one or more electronic devices within an environment.

At 602, the remote service receives, from a first electronic device, a message indicating that the first electronic device is responsible for controlling a first secondary device. In some instances, the remote service receives the message in response to querying the first electronic device. At 604, the remote service stores an indication that the first electronic device is responsible for controlling the first secondary device. At 606, the remote service receives, from a second electronic device, a message indication that the second electronic device is responsible for controlling a second secondary device. In some instances, the remote service receives this second message in response to querying the second electronic device. At 608, the remote service stores an indication that the second electronic device is responsible for controlling the second secondary device.

At 610, the remote service receives a message from the first electronic device indicating an updated state of the first secondary device. In response, at 612 the remote service stores an indication of the updated state. At 614, meanwhile, the remote service receives a request to change a state of a particular secondary device in the environment, which may or may not be owned by the remote service. At 616, the remote service determines whether it is responsible for controlling secondary device associated with the request. If not, then at 618 the remote service sends the request to the electronic device responsible for controlling the secondary device. If, however, the remote service determines that it is responsible for controlling the secondary device, then at 620 the remote service sends a request to the secondary device to update its state. Again, if the secondary device does so successfully, then it may send an indication of this success back to the remote service, which may not only update its own local state, but may also broadcast out this message to other instances of the control engine.

Figure 7:
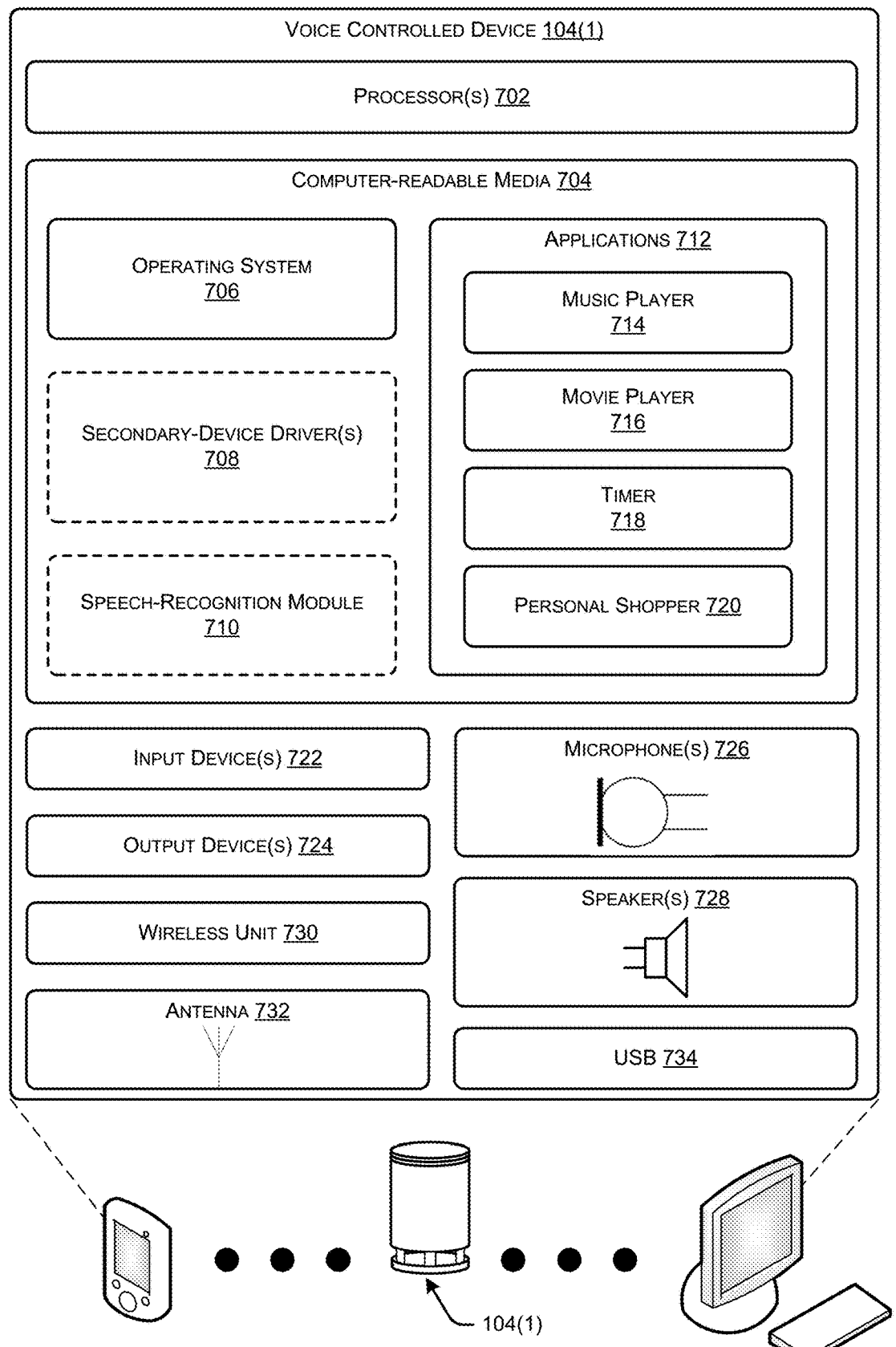
FIG. 7 illustrates example components of an electronic device, such as the voice-controlled device of FIG. 1, configured to control one or more secondary devices within an environment.

FIG. 7 illustrates example components of an electronic device, such as the voice-controlled device 104(1) of FIG. 1, configured to control one or more secondary devices 102 within an environment. The voice-controlled device 104(1) may be implemented as a standalone device 104(1) that is relatively simple in terms of functional capabilities with limited input/output components, memory, and processing capabilities. For instance, the voice-controlled device 104(1) does not have a keyboard, keypad, or other form of mechanical input. Nor does it have a display (other than simple lights, for instance) or touch screen to facilitate visual presentation and user touch input. Instead, the device 104(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 104(1) is through voice input and audible output.

The voice-controlled device 104 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the voice-controlled device 104 may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the voice-controlled device 104 includes one or more processors 702 and computer-readable media 704. In some implementations, the processors(s) 702 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 702 may possess its own local memory, which also may store program modules, program data, and/or one or more operating systems.

The computer-readable media 704 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 704 may be implemented as computer-readable storage media ("CRSM"), which may be any available physical media accessible by the processor(s) 702 to execute instructions stored on the memory 704. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 702.

Several modules such as instruction, datastores, and so forth may be stored within the computer-readable media 704 and configured to execute on the processor(s) 702. A few example functional modules are shown as applications stored in the computer-readable media 704 and executed on the processor(s) 702, although the same functionality may alternatively be implemented in hardware, firmware, or as a system on a chip (SOC).

An operating system module 706 may be configured to manage hardware and services within and coupled to the device 104 for the benefit of other modules. In addition, in some instances the device 104 may include some or all of one or more secondary-device drivers 708. In other instances, meanwhile, the device 104 may be free from the drivers 708 for interacting with secondary devices. The device 104 may further including, in some instances, a speech-recognition module 710 that employs any number of conventional speech processing techniques such as use of speech recognition, natural language understanding, and extensive lexicons to interpret voice input. In some instances, the speech-recognition module 710 may simply be programmed to identify the user uttering a predefined word or phrase (i.e., a "wake word"), after which the device 104 may begin uploading audio signals to the remote service 112 for more robust speech-recognition processing. In other examples, the device 104 itself may, for example, identify voice commands from users and may provide indications of these commands to the remote service 112.

The voice-controlled device 104 may also include a plurality of applications 712 stored in the computer-readable media 704 or otherwise accessible to the device 104. In this implementation, the applications 712 are a music player 714, a movie player 716, a timer 718, and a personal shopper 720. However, the voice-controlled device 104 may include any number or type of applications and is not limited to the specific examples shown here. The music player 714 may be configured to play songs or other audio files. The movie player 716 may be configured to play movies or other audio visual media. The timer 718 may be configured to provide the functions of a simple timing device and clock. The personal shopper 720 may be configured to assist a user in purchasing items from web-based merchants.

Generally, the voice-controlled device 104 has input devices 722 and output devices 724. The input devices 722 may include a keyboard, keypad, mouse, touch screen, joystick, control buttons, etc. In some implementations, one or more microphones 726 may function as input devices 722 to receive audio input, such as user voice input. The output devices 724 may include a display, a light element (e.g., LED), a vibrator to create haptic sensations, or the like. In some implementations, one or more speakers 728 may function as output devices 724 to output audio sounds.

A user 108 may interact with the voice-controlled device 104 by speaking to it, and the one or more microphone(s) 726 captures the user's speech. The voice-controlled device 104 can communicate back to the user by emitting audible statements through the speaker 728. In this manner, the user 108 can interact with the voice-controlled device 104 solely through speech, without use of a keyboard or display.

The voice-controlled device 104 may further include a wireless unit 730 coupled to an antenna 732 to facilitate a wireless connection to a network. The wireless unit 730 may implement one or more of various wireless technologies, such as Wi-Fi, Bluetooth, RF, and so on. A USB port 734 may further be provided as part of the device 104 to facilitate a wired connection to a network, or a plug-in network device that communicates with other wireless networks. In addition to the USB port 734, or as an alternative thereto, other forms of wired connections may be employed, such as a broadband connection.

Accordingly, when implemented as the primarily-voice-operated device 104(1), there may be no input devices, such as navigation buttons, keypads, joysticks, keyboards, touch screens, and the like other than the microphone(s) 726. Further, there may be no output such as a display for text or graphical output. The speaker(s) 728 may be the main output device. In one implementation, the voice-controlled device 104(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 104(1) may be implemented as an aesthetically appealing device with smooth and rounded surfaces, with one or more apertures for passage of sound waves. The device 104(1) may merely have a power cord and optionally a wired interface (e.g., broadband, USB, etc.). As a result, the device 104(1) may be generally produced at a low cost. Once plugged in, the device may automatically self-configure, or with slight aid of the user, and be ready to use. In other implementations, other I/O components may be added to this basic model, such as specialty buttons, a keypad, display, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
    detecting, by a first electronic device, a presence, of a secondary device within an environment of the first electronic device;
    establishing, by the first electronic device utilizing a first protocol adapter first electronic device;
    establishing, by the first electronic device utilizing a second protocol adapter, a second connection between the first electronic device and a second electronic device, the second electronic device unable to connect to the secondary device;
    sending, by the first electronic device utilizing the second protocol adapter, a first message indicating that the first electronic device is responsible for controlling the secondary device within the environment;
    receiving, at the second electronic device, a request to change a state of the secondary device;
    sending, by the second electronic device utilizing the second protocol adapter and based at least in part on the first message, a second message comprising an indication of the request to the first electronic device via the second connection;
    receiving, by the first electronic device utilizing the second protocol adapter, the second message from the third electronic device representing the indication to change the state of the secondary device; and
    based at least in part on receiving the second message, causing, by the first electronic device utilizing the first protocol adapter the secondary device to perform an operation associated with changing the state of the secondary device.

2. The method of claim 1, wherein the detecting the presence of the secondary device comprises detecting the presence of the secondary device in the environment at least partly in response to the secondary device being disconnected from the second electronic device.

3. The method of claim 1, wherein the detecting the presence of the secondary device comprises detecting the presence of the secondary device in the environment at least partly in response to the second electronic device experiencing a failure event.

4. The method of claim 1, wherein the first electronic device comprises a voice-controlled device, and further comprising:
    generating an audio signal based at least in part on sound captured by at least one microphone of the voice-controlled device;
    sending the audio signal to one or more computing devices that are remote from the environment;
    receiving, from the one or more computing devices, a second indication of a voice command represented by the audio signal, the voice command related to an operation to be performed by the secondary device; and
    sending, to the secondary device, an instruction to cause the secondary device to perform the operation.

5. The method of claim 1, wherein the first electronic device comprises a voice-controlled device, and further comprising:
    generating an audio signal based at least in part on sound captured by at least one microphone of the voice-controlled device;

performing speech recognition on the audio signal to determine a voice command represented by the audio signal, the voice command related to an operation to be performed by the secondary device; and sending, to the secondary device, an instruction to cause the secondary device to perform the operation.

6. The method of claim 1, wherein the second electronic device comprises a voice-controlled device;

wherein receiving, at the second electronic device, a request to change a state of the secondary device comprises generating an audio signal based at least in part on sound captured by at least one microphone of the second electronic device; and wherein the method further comprises:
sending, by the second electronic device, the audio signal to one or more computing devices that are remote from the environment, and
receiving, from the one or more computing devices, a second indication of a voice command represented by the audio signal.

7. The method of claim 1, wherein the second electronic device comprises a voice-controlled device;

wherein receiving, at the second electronic device, a request to change a state of the secondary device comprises generating an audio signal based at least in part on sound captured by at least one microphone of the second electronic device; and wherein the method comprises performing, by the second electronic device, speech recognition on the audio signal to determine a voice command represented by the audio signal.

8. A first electronic device comprising:
a first adapter;
a second adapter;
one or more processors;
one or more non-transitory computer-readable media storing computer-executable instructions that, when executed by the one or more processors, are effective to perform operations comprising:
detecting, by the first electronic device, a presence, within an environment of the first electronic device, of a secondary device that has lost connectivity with a second electronic device;
establishing, utilizing the first adapter of the first electronic device, a first connection between the first electronic device and the secondary device;
sending, by the first electronic device utilizing the second adapter of the first electronic device, a first message indicating that the first electronic device is responsible for controlling the secondary device within the environment;
receiving, by the first electronic device utilizing the second adapter of the first electronic device, a second message from a third electronic device unable to connect to the secondary device, the second message representing an indication to change a state of the secondary device; and
based at least in part on the second message, causing, by the first electronic device utilizing the first adapter of the first electronic device, the secondary device to perform an operation associated with changing the state of the secondary device.

9. The first electronic device of claim 8, wherein the first electronic device comprises a voice-controlled device; and wherein the one or more non-transitory computer-readable media store computer-executable instructions that, when executed by the one or more processors, are effective to perform operations comprising:
generating an audio signal based at least in part on sound captured by at least one microphone of the first electronic device;
sending the audio signal to one or more computing devices that are remote from the environment;
receiving, from the one or more computing devices, a second indication of a voice command represented by the audio signal, the voice command related to an operation to be performed by the secondary device; and
sending, to the secondary device, an instruction to cause the secondary device to perform the operation.

10. The first electronic device of claim 8, wherein the first electronic device comprises a voice-controlled device; and wherein the one or more non-transitory computer-readable media store computer-executable instructions that, when executed by the one or more processors, are effective to perform operations comprising:
generating an audio signal based at least in part on sound captured by at least one microphone of the first electronic device;
performing speech recognition on the audio signal to determine a voice command represented by the audio signal, the voice command related to an operation to be performed by the secondary device; and
sending, to the secondary device, an instruction to cause the secondary device to perform the operation.

11. The first electronic device of claim 8, wherein the one or more non-transitory computer-readable media store computer-executable instructions that, when executed by the one or more processors, are effective to perform operations comprising sending, by the first electronic device to the second electronic device utilizing the second adapter of the first electronic device, a message indicating that the first electronic device is responsible for controlling the secondary device.

12. The first electronic device of claim 8, wherein the second electronic device is a same type of device as the third electronic device.

13. The first electronic device of claim 8, wherein the second electronic device is a different electronic device than the third electronic device.

14. The first electronic device of claim 8, wherein the first connection comprises a Bluetooth connection.

15. The first electronic device of claim 8, wherein the detecting the presence of the secondary device comprises detecting the presence of the secondary device in the environment at least partly in response to the secondary device being disconnected from the second electronic device.

16. The first electronic device of claim 8, wherein the detecting the presence of the secondary device comprises detecting the presence of the secondary device in the environment at least partly in response to the second electronic device experiencing a failure event.

17. A first electronic device comprising:
a first adapter;
a second adapter;
one or more processors;
one or more non-transitory computer-readable media storing computer-executable instructions that, when executed by the one or more processors, are effective to perform operations comprising:
determining that the first electronic device is incapable of communicating with a secondary device using the first adapter, the first adapter associated with a first networking protocol utilized by the secondary device;

receiving, by the first electronic device utilizing the second adapter, a first message indicating that a second electronic device is responsible for controlling the secondary device within the environment, the second adapter associated with a second networking protocol that is different than the first networking protocol;

receiving, at the first electronic device, a request to change a state of the secondary device; and sending, by the first electronic device utilizing the second adapter and based at least in part on the first message, a second message comprising an indication of the request to the second electronic device, the second message sent to the second electronic device to cause the secondary device to perform an operation.

18. The first electronic device of claim 17, wherein the first electronic device comprises a voice-controlled device;

wherein receiving, at the first electronic device, a request to change a state of the secondary device comprises generating an audio signal based at least in part on sound captured by at least one microphone of the first electronic device; and wherein the one or more non-transitory computer-readable media store computer-executable instructions that, when executed by the one or more processors, are effective to perform operations comprising:

sending, by the first electronic device, the audio signal to one or more computing devices that are remote from the environment, and receiving, from the one or more computing devices, a second indication of a voice command represented by the audio signal.

19. The first electronic device of claim 17, wherein the first electronic device comprises a voice-controlled device;

wherein receiving, at the first electronic device, a request to change a state of the secondary device comprises generating an audio signal based at least in part on sound captured by at least one microphone of the first electronic device; and wherein the one or more non-transitory computer-readable media store computer-executable instructions that, when executed by the one or more processors, are effective to perform operations comprising performing, by the first electronic device, speech recognition on the audio signal to determine a voice command represented by the audio signal.

20. The first electronic device of claim 17, wherein the one or more non-transitory computer-readable media store computer-executable instructions that, when executed by the one or more processors, are effective to perform operations comprising establishing, utilizing the first adapter, a connection, with the secondary device.

* * * * *